(12) United States Patent
Zhu et al.

(10) Patent No.: US 11,418,499 B2
(45) Date of Patent: *Aug. 16, 2022

(54) PASSWORD SECURITY

(71) Applicant: Microsoft Technology Licensing, LLC, Redmond, WA (US)

(72) Inventors: Liqiang Zhu, Bellevue, WA (US); Yi Zeng, Bothell, WA (US); Yu Huang, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 379 days.

This patent is subject to a terminal disclaimer.

(21) Appl. No.: 16/517,350

(22) Filed: Jul. 19, 2019

(65) Prior Publication Data

US 2019/0342278 A1    Nov. 7, 2019

Related U.S. Application Data

(63) Continuation of application No. 15/428,848, filed on Feb. 9, 2017, now Pat. No. 10,404,689.

(51) Int. Cl.
*H04L 9/40* (2022.01)
*G06F 21/60* (2013.01)
*H04L 9/32* (2006.01)
*H04L 9/00* (2022.01)
(Continued)

(52) U.S. Cl.
CPC ............ *H04L 63/083* (2013.01); *G06F 21/31* (2013.01); *G06F 21/45* (2013.01); *G06F 21/602* (2013.01);
(Continued)

(58) Field of Classification Search
CPC ..... H04L 63/083; H04L 63/06; H04L 63/102; H04L 63/1433; H04L 9/3247;
(Continued)

(56) References Cited

U.S. PATENT DOCUMENTS

| 7,890,767 | B2 * | 2/2011 | Smith | H04L 63/126 |
| | | | | 713/182 |
| 8,099,765 | B2 * | 1/2012 | Parkinson | H04L 9/3226 |
| | | | | 726/5 |

(Continued)

FOREIGN PATENT DOCUMENTS

WO    WO-2015027852 A1 *  3/2015    ............. G06F 21/31

OTHER PUBLICATIONS

"Office Action Issued in Indian Patent Application No. 201947033624", dated Apr. 30, 2021, 6 Pages.

(Continued)

*Primary Examiner* — Lynn D Feild
*Assistant Examiner* — Abdullah Almamun
(74) *Attorney, Agent, or Firm* — Rainier Patents, P.S.

(57) ABSTRACT

The description relates to password reset security. One example can receive a login request and a password for a cloud-based user account. The example can also retrieve stored authenticated user information associated with the password. The example can further send a notification of the login request to a contact address associated with the cloud-based user account. The notification can contain at least some of the stored authenticated user information.

20 Claims, 6 Drawing Sheets

(51) Int. Cl.
*G06F 21/31* (2013.01)
*G06F 21/45* (2013.01)
*G06F 21/62* (2013.01)
G06F 21/35 (2013.01)
H04L 67/01 (2022.01)

(52) U.S. Cl.
CPC .......... *G06F 21/6218* (2013.01); *H04L 9/006* (2013.01); *H04L 9/3247* (2013.01); *H04L 63/06* (2013.01); *H04L 63/102* (2013.01); *H04L 63/1433* (2013.01); *G06F 21/35* (2013.01); *G06F 2221/2131* (2013.01); *H04L 67/01* (2022.05)

(58) Field of Classification Search
CPC ......... H04L 9/006; H04L 67/42; G06F 21/31; G06F 21/50; G06F 21/602; G06F 21/86; G06F 21/35; G06F 2221/2131
See application file for complete search history.

(56) References Cited

U.S. PATENT DOCUMENTS

| | | | | |
|---|---|---|---|---|
| 8,904,506 | B1* | 12/2014 | Canavor | H04L 63/083 713/182 |
| 9,514,294 | B1* | 12/2016 | Hepburn | G06F 21/6218 |
| 10,025,914 | B1* | 7/2018 | Hatch | G06F 21/36 |
| 10,826,875 | B1* | 11/2020 | Kim | H04L 63/0442 |
| 2007/0130473 | A1* | 6/2007 | Mazotas | H04L 63/0853 713/183 |
| 2009/0313045 | A1* | 12/2009 | Boyce | G16H 10/20 705/3 |
| 2012/0084844 | A1* | 4/2012 | Brown | G06F 21/34 726/6 |
| 2014/0237627 | A1* | 8/2014 | Mylavarapu | H04L 63/0428 726/30 |
| 2015/0082411 | A1* | 3/2015 | Hook | H04L 63/0823 726/10 |
| 2015/0242812 | A1* | 8/2015 | Nelson | G16H 40/67 705/311 |
| 2016/0212141 | A1* | 7/2016 | Banerjee | H04W 12/082 |
| 2016/0373258 | A1* | 12/2016 | Bone | G06F 21/575 |
| 2017/0171189 | A1* | 6/2017 | Byszio | H04L 63/0815 |
| 2018/0240107 | A1* | 8/2018 | Andrade | G06Q 20/36 |

OTHER PUBLICATIONS

"Office Action Issued in European Patent Application No. 18706041. 3", dated Mar. 30, 2020, 6 Pages.

* cited by examiner

SYSTEM 100

INSTANCE ONE

INSTANCE TWO

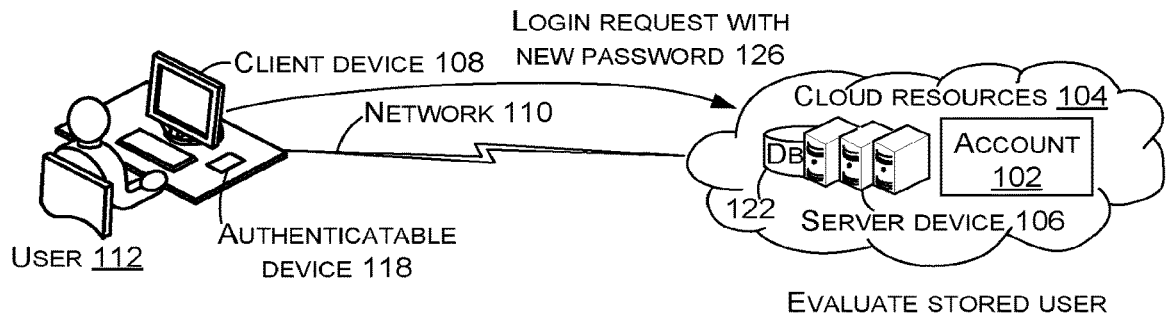
INSTANCE THREE
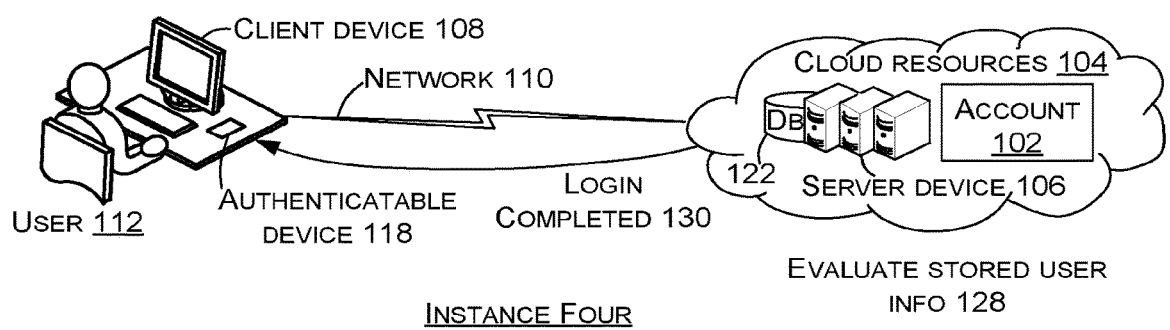
INSTANCE FOUR
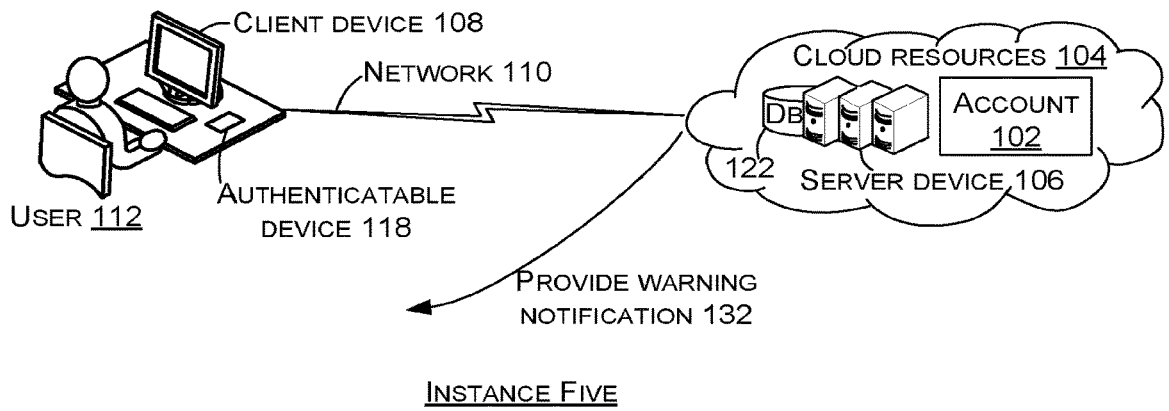
INSTANCE FIVE
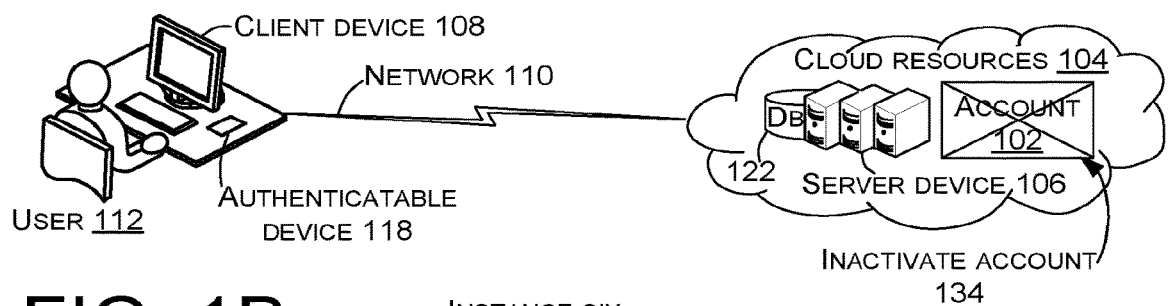
FIG. 1B    INSTANCE SIX

PASSWORD SECURITY

BACKGROUND

Various nefarious techniques have been employed to breach account security. Often the breaches are not discovered until much later and with existing technologies it is difficult to determine who was responsible for the breach.

BRIEF DESCRIPTION OF THE DRAWINGS

The accompanying drawings illustrate implementations of the concepts conveyed in the present application. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the Figure and associated discussion where the reference number is first introduced.

FIGS. 1A-1B and 5 show example systems to which the present password reset security concepts can be applied in accordance with some implementations.

DETAILED DESCRIPTION

The present concepts relate to account security. One aspect of account security relates to resetting a password protecting the account. Traditionally, information is not maintained about the conditions associated with a password change. Thus, if a nefarious actor is able to cause a password to be reset, the nefarious actor may be able to use the new password to log into the account and compromise the account. Further, little or no evidence is available for identifying the nefarious actor. The present concepts gather and store information about the user who is requesting the password reset. This information can be evaluated when the new password is used to access the account to determine whether the user is legitimate or nefarious and appropriate action can be taken to protect the account.

Figure 1A:
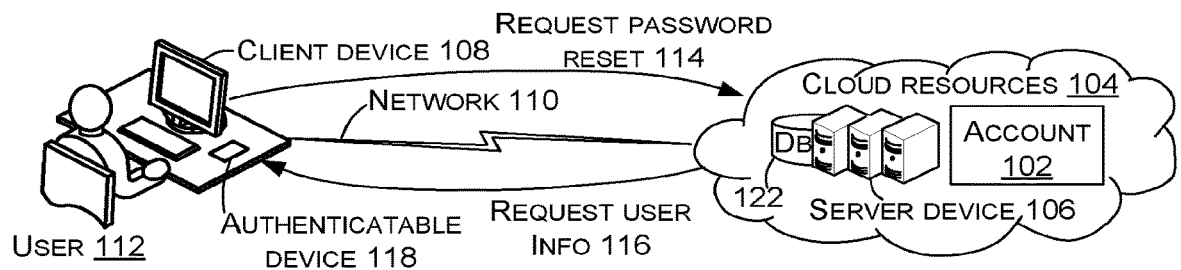

FIGS. 1A and 1B collectively show an example account protection scenario relating to system 100. The system includes an account 102 (e.g., a user account). The account is maintained by cloud-based resources or cloud resources 104 that can include multiple servers or server devices 106. The account may be protected by various security measures, such as requiring a password to access the account. A local or client device 108 can communicate with the cloud-based resources 104 via a network 110 (represented by a lightning bolt). A user 112 can use the client device 108 to access the account 102.

For purposes of explanation, assume that at Instance One, user 112 wants to access the account and requests an account password reset 114. The cloud-based resources 104 can gather information about the user 112 as part of the password reset process. For instance, the cloud-based resources may request information associated with the user (e.g., request user info 116). Some of this information may be obtained from the client device, such as a serial number of the client device, an internet protocol (IP) address of the client device, and/or a date/time, among other information. Some of this information may be obtained directly from the user. For instance, the user may have supplied (or be requested to supply) a personal identification number (PIN) during the password reset process. Further, the user may establish (or be requested to establish) communication between the client device and another device in his/her possession. For example, the user may have an authenticatable device 118 in his/her possession. An example of an authenticatable device can be a tamper-resistant device that stores cryptographic information, such as private and public keys associated with a public key infrastructure (PKI) (e.g., public/private key pair). The authenticatable device 118 can increase the trust level of the user information. For instance, the PKI can be used to create a digital signature over the user information obtained from the client device.

At Instance Two, the cloud-based resources 104 can gather the user information at 120 and store the user information, such as in database (DB) 122. The cloud-based resources can reset the password and send the new password 124 to the user 112 in a predefined manner, such as by sending the new password to an email address associated with the account 102 (e.g., account contact defined at account set-up).

FIG. 1B relates to the new password being used to login to the account 102. At Instance Three, a login request 126 with the new password is received by the cloud-based resources 104. In this case, the login request is received from the same client device 108 as in FIG. 1A, but a different client device could be used. At 128, the cloud-based resource's server devices 106 can evaluate the stored user information associated with obtaining the new user password. Various techniques can be employed in the evaluation. For instance, a simple evaluation can determine if each field of user information has a value (e.g., is not blank). For instance, if the IP address is blank this could be an indication that the password was obtained nefariously. For example, the password reset may have been obtained by hacking into the cloud-based resources such that a password reset was generated without storing associated user information.

In some implementations, the evaluation may produce a confidence level for the stored user information. For instance, if all user information is present and trusted, then the confidence level may be relatively high. Alternatively, some information may be missing, or the trust worthiness (e.g., confidence level) of the information may be low. Stated another way, the confidence level is inversely related to 'suspiciousness' of the password (e.g., high confidence equals less suspicious and low confidence equals more suspicious). The system can take an action commensurate with the evaluation. Examples are shown in Instances Four through Six.

At Instance Four, the confidence in the stored user information is relatively high and at 130 the login was completed for the account 102 using the new password. Stated another way, in this case, the 'user' is likely the 'true user.'

At Instance Five, the confidence level is not as high as at Instance Four. In this case, the login is completed as in Instance Four, but at 132 a warning notification is also sent to a contact associated with the account 102. For instance, this warning notification could be an email message sent to an email address provided when the account was initially set-up. The email message can include some or all of the user information.

At Instance Six, the confidence level is lower than at Instances Four and Five. Stated another way, in this case, the 'user' is likely a 'nefarious user' or 'nefarious actor.' In this case, the login was not completed and instead, at 134 the account 102 was temporarily inactivated to protect the account.

From one perspective, FIGS. 1A and 1B describe implementations that can save information associated with a password change. This information can provide details, such as whom, when, and/or where a password reset request was received. This information can be used to protect the account 102 and/or the cloud-based resources 104 from nefarious exploitation. Note also, that even if the evaluation is incorrect (e.g., a nefarious actor is not identified or the true user is mischaracterized), a record of information about the password reset is stored and can be reviewed later.

Figure 2:
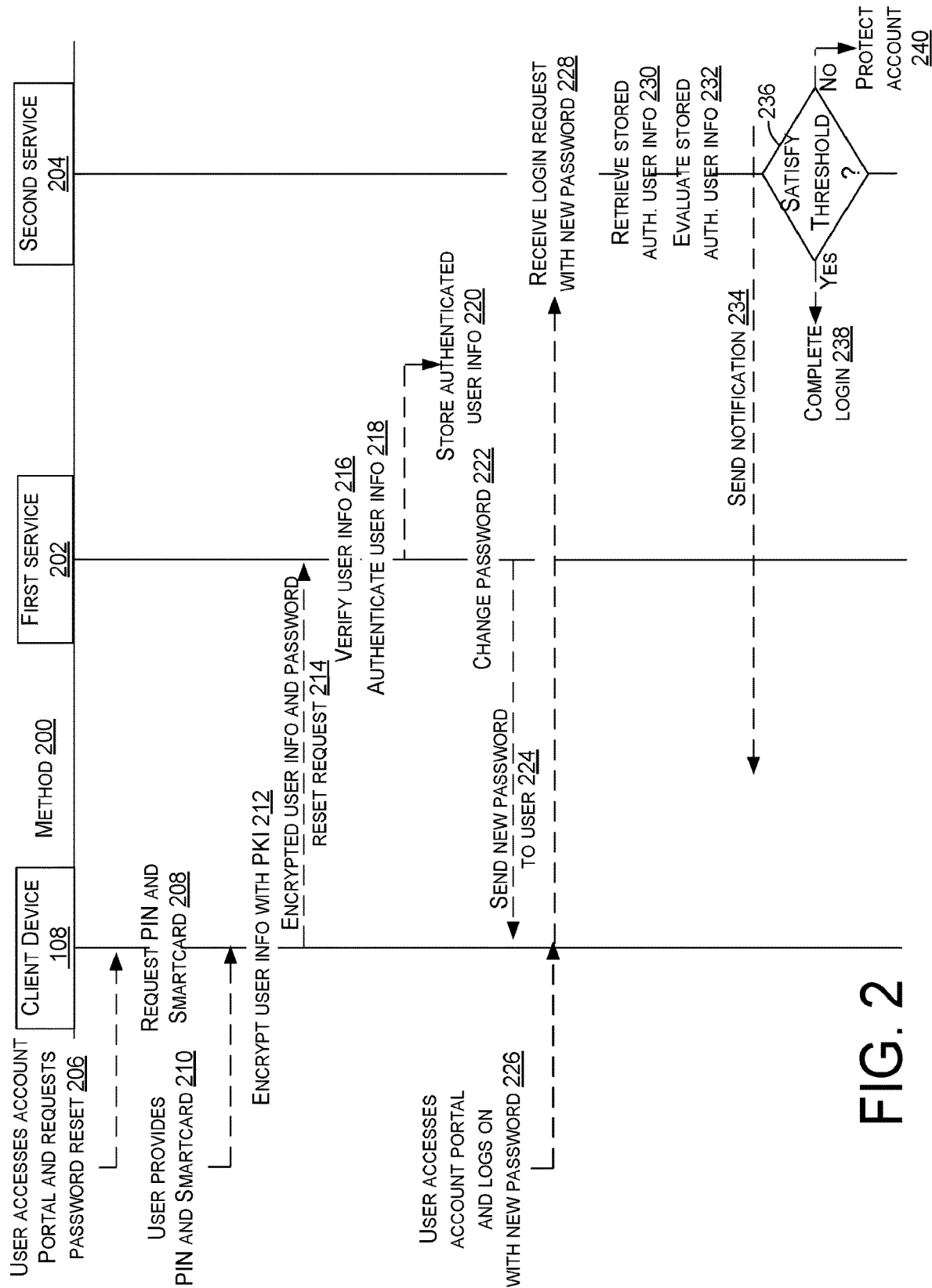
FIGS. 2-4 show example password reset security methods in accordance with some implementations.

FIG. 2 shows a password reset security method 200. In this case, the method is accomplished by client device 108 and first and second services 202 and 204. From the explanation below, the first service can be viewed as a password reset service and the second service can be viewed as a password filter service. The services can be provided by the cloud-based resources 104 of FIGS. 1A and 1B. For purposes of explanation, the method is explained in a specific order, but the order and/or elements may be re-arranged in other method implementations.

Figure 1A:
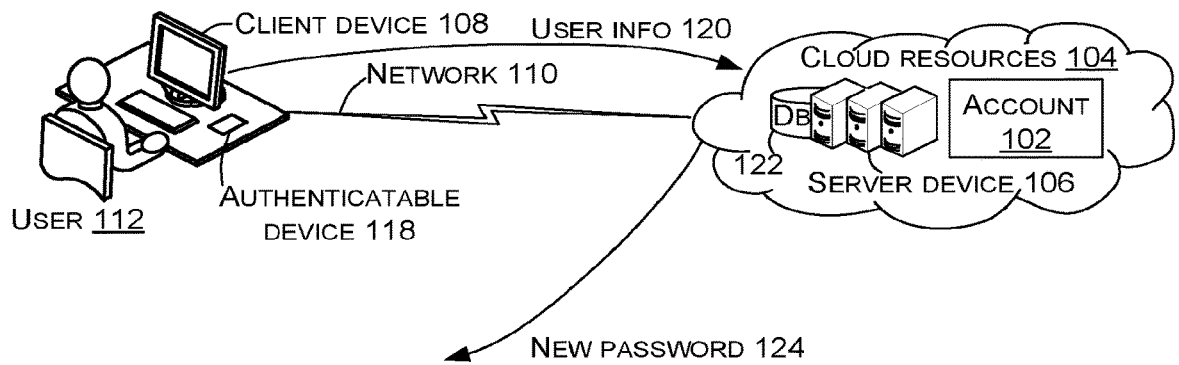

In this example, method 200 starts at 206 when a user accesses an account portal and requests a password reset using client device 108. At 208 user information can be requested. In this case, the user information includes a personal access number (PIN) and smartcard (or other secure, authenticatable device that has a tamper resistant public/private encryption key pair). At 210, the user provides the PIN and the smartcard. For instance, the user may enter the PIN on a keypad or keyboard and position the smart card proximate to a card reader. The client device may gather additional user information, such as its own IP address, serial number, date, time, etc. At 212 the client device can encrypt the user information with the PKI. This encryption can enhance the security and reliability of the user information (e.g., help to ensure that the user information is accurate and trusted). Other techniques that help to ensure the accuracy of the user information can be alternatively or additionally employed. At 214, the client device can send the encrypted user information and the password reset request to the first service 202. In this example, the first service can be an application that manages the account 102. For example, the application could manage accounts for a datacenter provided by the cloud-based resources (104, FIG. 1).

At 216, the first service 202 can verify the user information. For instance, the first service can verify whether the user's smart card certificate is valid and trusted by doing certificate chain building. The first service can also encrypt a service ticket with the user's smart card certificate to ensure the user has the correct smart card and PIN. The first service can also collect additional information about the user. This additional information can contribute to being able to determine whom (user), when (date), where (first service name and/or user client device name), etc. This additional information may supplement information obtained from the client device 108 and/or be redundant to information from the client device. At 218, the first service can authenticate the user information. For instance, the first service can perform a password hash and sign the information with its own certificate (e.g., with a certificate associated with the first service). At 220, the first service can save the information. As mentioned above, a database, such as database 122 of FIG. 1, may be used to store the information. In one example, the database can be manifest as a user account active directory object stored in an Active Directory database, supplied by Microsoft Corp. Beyond this example, other database solutions can be employed.

At 222, the first service 202 can change the password. At 224, the first service can send the new password to the user (e.g., to the client device 108).

At 226, the user can access the account portal to login to the account with the new password.

The second service 204 can receive the login request with the new password at 228. At 230 the second service can retrieve the stored signed user information (e.g. stored at 220) associated with the new password. At 232 the second service can evaluate the stored signed user information. Various techniques that can be applied in the evaluation are described above relative to FIG. 1B. In some cases, a confidence level can be established for the user information.

At 234, the second service 204 can send a notification about the password reset in a manner established when the account was set-up. For instance, a contact email address could have been selected and defined by the user at account set up. The notification can be sent to this email address. The notification can include information about the password reset request, such as whom/when/where information (e.g., information about user and/or smartcard, client device identifying information, client device IP address, date/time, first service identifying information, cloud-based resources identifying information, etc.). If the user trying to login is not the 'true' user, the true user upon receipt of the notification has a record of information about the user and can now take an action to protect the account.

At 236, the second service 204 can compare the confidence level for the user information to a threshold. For instance, if any fields in the user information are blank, the confidence level can fail the threshold. For example, if the IP address of the client device 108 is missing (e.g., blank), then the confidence level can fall below the threshold. In another example, if any of the information does not match an expected value, the confidence level can fall below the threshold. For instance, if the smartcard PKI information does not match information from a trusted issuing entity, the confidence level can be below the threshold. Alternatively, if the signature and/or certificate of the first service 202 do not match expected values, confidence levels can fail the threshold. Stated another way, if the account password change information is not present and/or signed properly, this can be an indication that the password change operation was not performed by the trusted first service and/or trusted user and instead the account password was changed by another tool or some suspicious manual operations.

In an instance where the confidence level in the user information satisfies the threshold (e.g., yes at 236), the second service 204 can complete the login process for the user at 238. In an alternative instance where the confidence level in the user information fails to satisfy the threshold (e.g., no at 236) the second service can take an action to protect the account at 240 from nefarious actors. For instance, the action could entail inactivating the account and/or limiting actions that can be performed on the account.

In the illustrated configuration, the second service 204 can be separate and distinct from the first service 202 so that the second service can evaluate actions both at the client side and the first service side. For instance, if a nefarious actor breached the first service and performed the password reset, the second service may detect inconsistencies and determine that the first service was not acting in a trusted manner.

Viewed from one perspective, some implementations can provide trusted information about Whom/When/Where (3W) changes to an account password. With this 3W information, cloud-based resources 104 and/or account security can be enhanced. The 3W information can be signed with a certificate and verified to prevent tampering. The password attestation information can contain the user's smart card certificate information, and server information (server device 106 identifying information and/or virtual machine information). The password attestation information can also be signed with the server certificate. This information can be used to track down whom/when/where made the change with tamper-proofing. Previous solutions could not detect that the operation was done by a particular user and/or service, and/or these previous solutions could not prevent information tampering.

Figure 3:
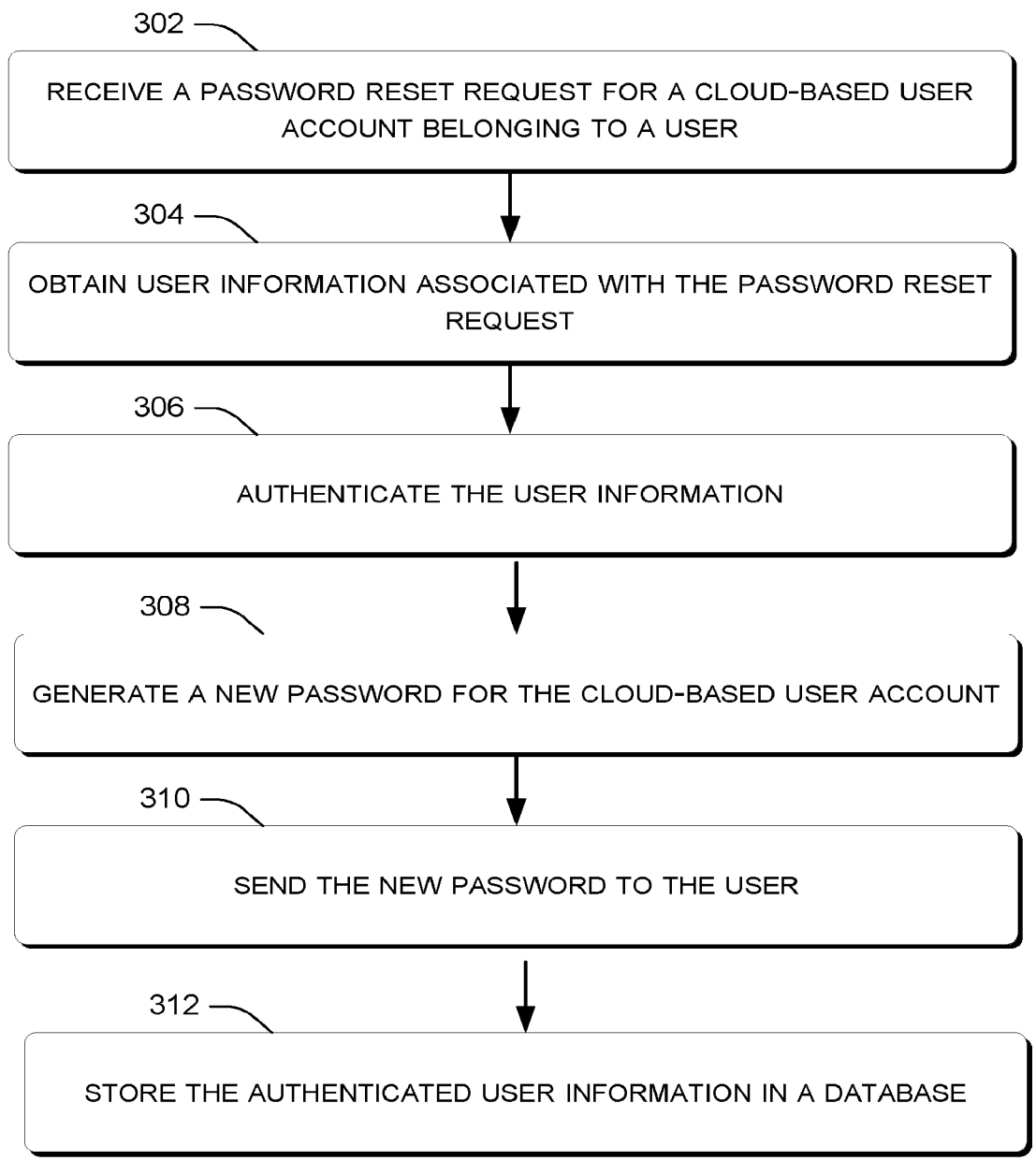

FIG. 3 illustrates a flowchart of a password security technique or method 300 that is consistent with at least some implementations of the present concepts.

At block 302, the method can receive a password reset request for a cloud-based user account belonging to a user (e.g., true user).

At block 304, the method can obtain user information associated with the password reset request. In one case the user information can be obtained with the password reset request. In another case, the user information can be requested upon receiving the password reset request. The user information can include various fields, such as a date and time field for the date and time the password reset was requested. Other information fields can relate to an authenticatable device, a serial number of a computing device upon which the password reset request was generated, an internet protocol (IP) address of the computing device, a personal identification number entered with the password reset request, and/or a user name entered with the password reset request. Various authenticatable devices can be employed. An authenticatable device can have a tamper-resistant hardware component that protects a public/private key pair. Example authenticatable devices can include smartcards and encrypted USB dongles, among others. The user information may be obtained encrypted with the public key at the client device.

At block 306, the method can authenticate the user information. For instance, the user information can be authenticated with a digital signature. In an instance when the user information is already encrypted when received, the user information can be authenticated by comparing the public key to an expected value from a trusted issuing entity that issued the public/private key pair.

At block 308, the method can generate a new password for the cloud-based user account.

At block 310, the method can send the new password to the user.

At block 312, the method can store the authenticated user information in a database.

Figure 4:
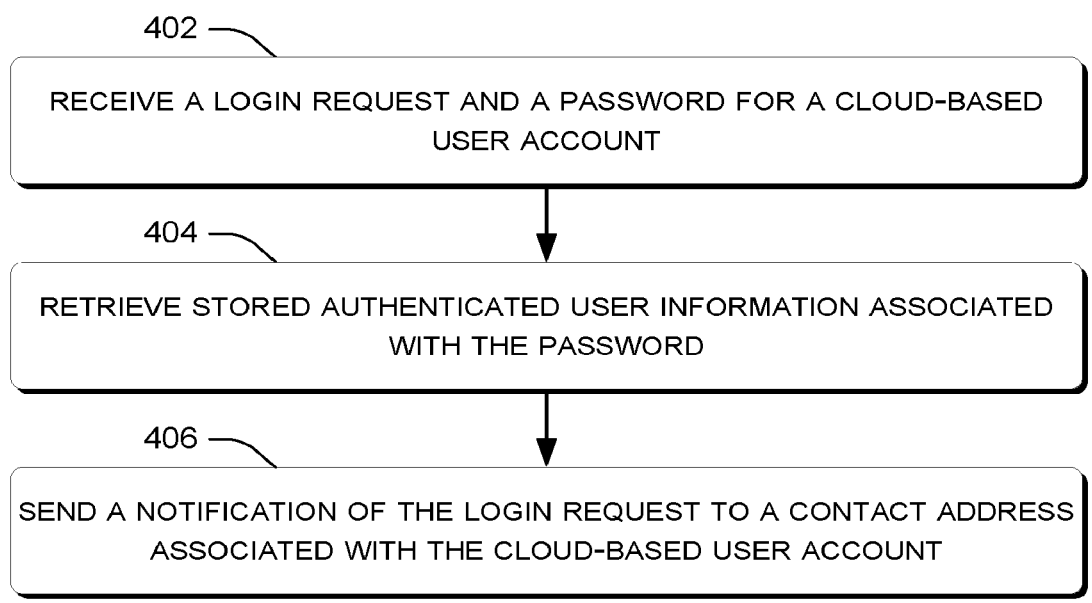

FIG. 4 illustrates a flowchart of a password security technique or method 400 that is consistent with at least some implementations of the present concepts.

At block 402, the method can receive a login request and a password for a cloud-based user account.

At block 404, the method can retrieve stored authenticated user information associated with the password.

At block 406, the method can send a notification of the login request to a contact address associated with the cloud-based user account. The notification can contain at least some of the stored authenticated user information.

In some implementations, the retrieving and sending can be performed each time the login request is received. In other implementations, the retrieving and sending are performed only when the login request is received and the password is new (e.g., initial use of a new password after reset).

Some implementations can also evaluate the stored authenticated user information. For instance, the evaluating can entail assigning a confidence level to the stored authenticated user information. The confidence level can reflect completeness of fields of the stored authenticated user information and/or trust of values of the stored authenticated user information.

The order in which the above-mentioned methods are described is not intended to be construed as a limitation, and any number of the described blocks can be combined in any order to implement the method, or an alternate method. Furthermore, the method can be implemented in any suitable hardware, software, firmware, or combination thereof, such that a computing device can implement the method. In one case, the method is stored on a computer-readable storage media as a set of instructions such that execution by a computing device causes the computing device to perform the method.

Figure 5:
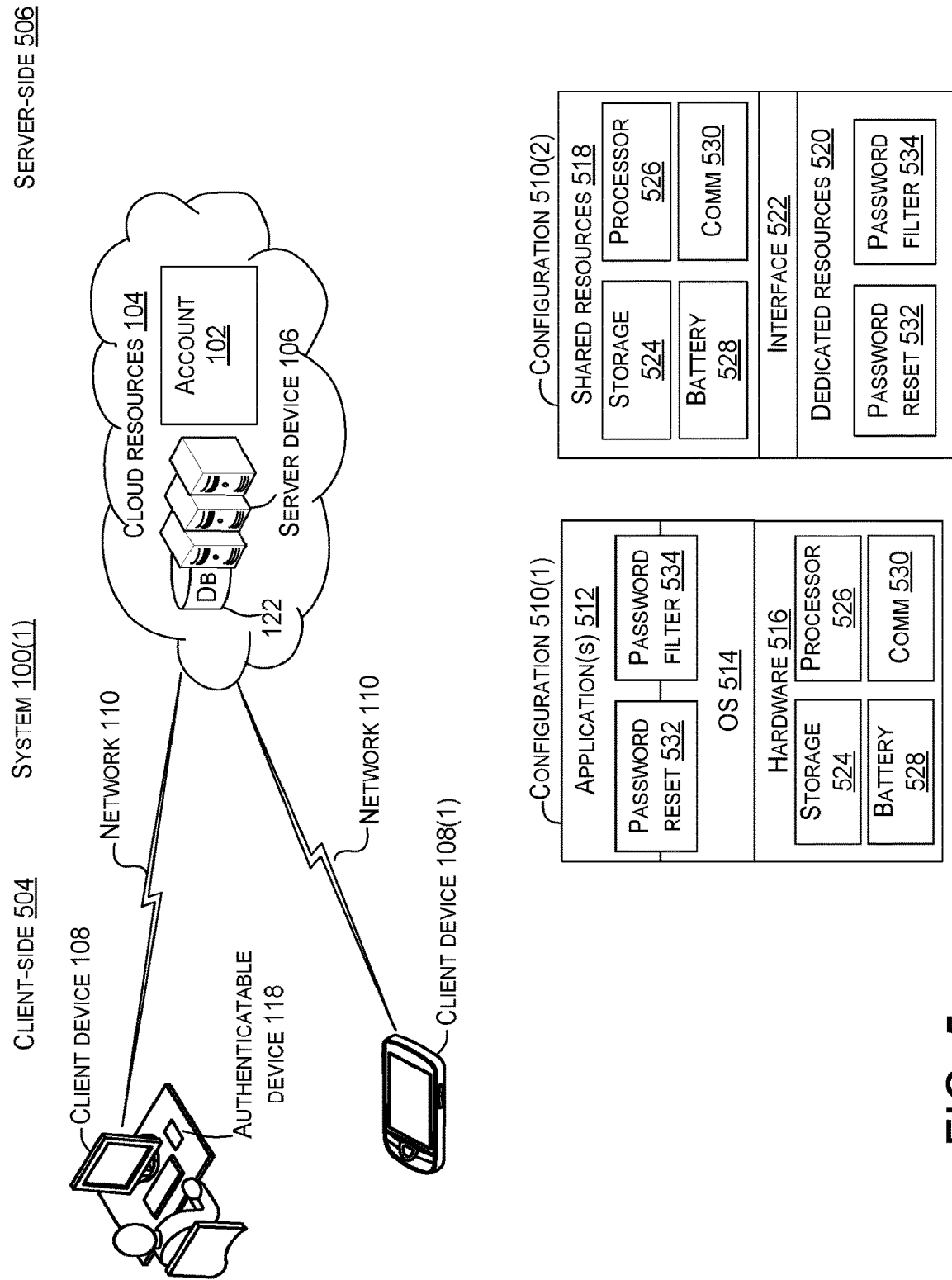

FIG. 5 shows a system 100(1) that is similar to system 100 of FIGS. 1A and 1B. System 100(1) includes client device 108 in the form of a desktop computer and client device 108(1) in the form of a mobile device, such as a tablet or smartphone. The client device 108 and server device 106 can employ various device configurations, two of which are illustrated as device configuration 510(1) and 510(2). Individual server devices 106 and/or client devices 108 can employ either of configurations 510(1) or 510(2), or an alternate configuration. (Due to space constraints on the drawing page, one instance of each configuration is illustrated rather than illustrating the device configurations relative to each device). Briefly, device configuration 510(1) represents an operating system (OS) centric configuration. Configuration 510(2) represents a system on a chip (SOC) configuration. Configuration 510(1) is organized into one or more applications 512, operating system 514, and/or hardware 516. Configuration 510(2) is organized into shared resources 518, dedicated resources 520, and an interface 522 there between.

In either configuration 510, the server devices 106 and/or client devices 108 can include storage/memory 524, a processor 526, a battery (or other power source) 528, a communication component 530, a password reset component 532, and/or a password filter component 534. On the client device 108 or 108(1), the password reset component can provide a graphical user interface (GUI) for the user to enter their PIN and request a password reset. It can also gather user information and interact with the user's smartcard (e.g., read the smartcard and/or encrypt user information with the smartcard's PKI). On the server device 106, the password reset component 532 can provide the first service 202 of FIG. 2, and the password filter component 534 can provide the second service 204 of FIG. 2.

The term "device," "computer," or "computing device" as used herein can mean any type of device that has some amount of processing capability and/or storage capability. Processing capability can be provided by one or more processors that can execute data in the form of computer-readable instructions to provide a functionality. Data, such as computer-readable instructions and/or user-related data, can be stored on storage, such as storage that can be internal or external to the device. The storage can include any one or more of volatile or non-volatile memory, hard drives, flash storage devices, and/or optical storage devices (e.g., CDs, DVDs etc.), remote storage (e.g., cloud-based storage), among others. As used herein, the term "computer-readable media" can include signals. In contrast, the term "computer-readable storage media" excludes signals. Computer-readable storage media includes "computer-readable storage devices." Examples of computer-readable storage devices include volatile storage media, such as RAM, and non-volatile storage media, such as hard drives, optical discs, and flash memory, among others.

As mentioned above, configuration 510(2) can be thought of as a system on a chip (SOC) type design. In such a case, functionality provided by the server devices 106 and/or client device 108 can be integrated on a single SOC or multiple coupled SOCs. One or more processors 526 can be configured to coordinate with shared resources 518, such as memory/storage 524, etc., and/or one or more dedicated resources 520, such as hardware blocks configured to perform certain specific functionality. Thus, the term "processor" as used herein can also refer to central processing units (CPUs), graphical processing units (GPUs), controllers, microcontrollers, processor cores, or other types of processing devices.

Generally, any of the functions described herein can be implemented using software, firmware, hardware (e.g., fixed-logic circuitry), or a combination of these implementations. The term "component" as used herein generally represents software, firmware, hardware, whole devices or networks, or a combination thereof. In the case of a software implementation, for instance, these may represent program code that performs specified tasks when executed on a processor (e.g., CPU or CPUs). The program code can be stored in one or more computer-readable memory devices, such as computer-readable storage media (e.g., storage 524). The features and techniques of the component are platform-independent, meaning that they may be implemented on a variety of commercial computing platforms having a variety of processing configurations.

Various examples are described above. Additional examples are described below. One example includes a computer-readable storage media having instructions stored thereon that when executed by a computing device cause the computing device to perform acts comprising the receiving of a password reset request for a cloud-based user account belonging to a user and obtaining user information associated with the password reset request. The computing device further authenticates the user information, generates a new password for the cloud-based user account, sends the new password to the user, and stores the authenticated user information in a database.

Another example can include any of the above and/or below examples where the obtaining comprises obtaining the user information with the password reset request.

Another example can include any of the above and/or below examples where the obtaining comprises requesting the user information upon receiving the password reset request.

Another example can include any of the above and/or below examples where the obtaining comprises obtaining the user information that includes a date and time of the password reset request, information from an authenticatable device, a serial number of a computing device upon which the password reset request was generated, an internet protocol (IP) address of the computing device, a personal identification number entered with the password reset request, and/or a user name entered with the password reset request.

Another example can include any of the above and/or below examples where the authenticatable device comprises a smartcard that includes a tamper resistant hardware component that contains a public/private key pair.

Another example can include any of the above and/or below examples where the obtaining comprises obtaining the user information encrypted with the public key.

Another example can include any of the above and/or below examples where the computer-readable storage media further comprises verifying the obtained user information by comparing the public key to an expected value from a trusted issuing entity that issued the public-private key pair.

Another example can include any of the above and/or below examples where the computer-readable storage media further comprises verifying the obtained user information by comparing the public key to an expected value from a trusted issuing entity that issued the public/private key pair.

Another example can include any of the above and/or below examples where the authenticating comprises authenticating the obtained user information with a digital signature.

Another example can include any of the above and/or below examples where upon receipt of a request to login to the account with the new password, the example evaluates the stored authenticated user information, and takes an action relating to the account based upon the evaluating.

Another example can include a method comprising the receiving of a login request and a password for a cloud-based user account, the retrieving of stored authenticated user information associated with the password, and the sending of a notification of the login request to a contact address associated with the cloud-based user account, the notification containing at least some of the stored authenticated user information.

Another example can include any of the above and/or below examples where the retrieving and sending are performed each time the login request is received.

Another example can include any of the above and/or below examples where the retrieving and sending are performed only when the login request is received and the password is new.

Another example can include any of the above and/or below examples where the method further comprises evaluating the stored authenticated user information.

Another example can include any of the above and/or below examples where the evaluating comprises assigning a confidence level to the stored authenticated user information.

Another example can include any of the above and/or below examples where the confidence level reflects completeness of fields of the stored authenticated user information and/or trust of values of the stored authenticated user information.

Another example can include any of the above and/or below examples where the method is performed by a password filter service.

Another example can include a system comprising storage that stores computer-readable instructions, and a processor that reads the computer-readable instructions to perform acts. The acts comprise the receiving of a login request for an account and a password for the account, the accessing of stored user information associated with obtaining the password for the account, and the sending of a notification including at least some of the user information to a predefined contact associated with the account. The acts further comprise the evaluating of the stored user information associated with obtaining the password for the account, and when the user information appears suspicious, protecting the user account, otherwise completing the login.

Another example can include any of the above and/or below examples where the processor executes a password filter that performs the method/acts.

Another example can include any of the above and/or below examples where the user information appears suspicious when fields of the user information are missing.

Another example can include any of the above and/or below examples where the user information appears suspicious when the user information is not signed.

Another example can include any of the above and/or below examples where the user information appears suspicious when a signature on the user information does not match an expected signature.

Another example can include any of the above and/or below examples where the stored user information relating to the password for the account includes information relating to who requested a password reset, from what computer the password reset was requested, and/or when the password reset was requested.

Although techniques, methods, devices, systems, etc., pertaining to password security are described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A method comprising:
  receiving a password reset request for a cloud-based user account associated with a user;
  obtaining user information associated with the password reset request;
  authenticating the user information associated with the password reset request;
  generating a new password for the cloud-based user account;
  sending the new password to the user;
  storing the authenticated user information associated with the password reset request in a database, the authenticated user information associated with the password reset request comprising at least one additional item of information other than the new password and other than a user name received with the password reset request;
  receiving a subsequent login request to login with the new password to the cloud-based user account; and
  responsive to the subsequent login request to login with the new password:
    evaluating whether the authenticated user information associated with the password reset request has been tampered with; and
    in at least one instance when the evaluating indicates that the authenticated user information has been tampered with, taking at least one action to protect the cloud-based user account.

2. The method of claim 1, further comprising:
  in another instance when the evaluating indicates that the authenticated user information has not been tampered with and the new password is correctly provided in the subsequent login request, completing the login to the cloud-based user account.

3. The method of claim 1, wherein the at least one additional item of information comprises one or more of:
  a date and time of the password reset request,
  information from an authenticatable device,
  a serial number of a computing device upon which the password reset request was generated,
  an internet protocol (IP) address of the computing device upon which the password reset request was generated, or
  a personal identification number received with the password reset request.

4. The method of claim 1, further comprising:
  evaluating whether the at least one additional item of information is present in the authenticated user information; and
  taking the at least one action to protect the cloud-based user account responsive to a determination that the at least one additional item of information is not present in the authenticated user information.

5. The method of claim 4, wherein the at least one action comprises sending the at least one additional item of information to a contact address associated with the cloud-based user account.

6. The method of claim 1, further comprising:
  evaluating whether the authenticated user information is properly signed with a digital signature; and
  taking the at least one action to protect the cloud-based user account responsive to a determination that the authenticated user information is not properly signed.

7. The method of claim 6, wherein the at least one action comprises sending the at least one additional item of information to a contact address associated with the cloud-based user account.

8. A method comprising:
  receiving a login request for a cloud-based user account having an associated user name and password;
  retrieving, from storage, authenticated user information that was received in association with a previous password reset for the cloud-based user account, wherein the previous password reset involved obtaining at least one item of information other than the user name and other than the password for inclusion in the authenticated user information;
  evaluating whether the authenticated user information associated with the previous password reset has been tampered with; and
  in at least one instance when the evaluating indicates that the authenticated user information has been tampered with, taking at least one action to protect the cloud-based user account.

9. The method of claim 8, further comprising:
  in another instance when the evaluating indicates that the authenticated user information has not been tampered with and the password is correctly provided in the login request, completing login to the cloud-based user account.

10. The method of claim 8, wherein the at least one item of information other than the user name and the password comprises:
  a first item of information identifying a person that requested the previous password reset,
  a second item of information identifying a computer that submitted a request to perform the previous password reset, or
  a third item of information identifying a time when the previous password reset was requested.

11. The method of claim 8, wherein the evaluating comprises:
  determining that the authenticated user information has been tampered with when the at least one item of information is not present in stored authenticated user information.

12. The method of claim 8, wherein the evaluating comprises:
   determining that the authenticated user information has been tampered with when the authenticated user information lacks a proper digital signature.

13. A computer-readable storage media having instructions stored thereon that, when executed by a computing device, cause the computing device to perform acts, the acts comprising:
   receiving a login request for a user account having an associated user name and password;
   evaluating whether at least one additional item of user information that was received in association with a previous password reset for the user account has been tampered with, the at least one additional item of user information comprising information other than the user name and the password; and
   in at least one instance when the evaluating indicates that the at least one additional item of user information has been tampered with, taking at least one action to protect the user account.

14. The computer-readable storage media of claim 13, the acts further comprising:
   in another instance when the evaluating indicates that the at least one additional item of user information has not been tampered with and the password is correctly provided in the login request, completing the login to the user account.

15. The computer-readable storage media of claim 13, wherein the taking at least one action comprises:
   sending the at least one additional item of user information to a contact address associated with the user account.

16. The computer-readable storage media of claim 13, wherein the evaluating the at least one additional item of user information comprises:
   evaluating authenticated user information that includes the at least one additional item of user information and one or more other items of user information.

17. The computer-readable storage media of claim 16, wherein the evaluating the at least one additional item of user information comprises:
   assigning a confidence level to the authenticated user information based at least on whether all of the authenticated user information is present when the login request is received.

18. The computer-readable storage media of claim 17, the acts further comprising:
   selecting the at least one action from a plurality of possible actions based at least on the confidence level.

19. The computer-readable storage media of claim 18, the acts further comprising:
   in at least one instance, selecting an action that inactivates the user account.

20. The computer-readable storage media of claim 19, the acts further comprising:
   in at least one instance, selecting another action that involves notifying a user of the user account that the at least one additional item of user information has been tampered with.

\* \* \* \* \*